United States Patent
Tsuda

(10) Patent No.: US 6,262,956 B1
(45) Date of Patent: Jul. 17, 2001

(54) REPRODUCING APPARATUS WITH IMPROVED ACCESS TO TEXT INFORMATION

(75) Inventor: Masayuki Tsuda, Tendo (JP)

(73) Assignees: Pioneer Electronic Corporation, Tokyo; Tohoku Pioneer Electronic Corporation, Yamagata-ken, both of (JP)

( * ) Notice: Subject to any disclaimer, the term of this patent is extended or adjusted under 35 U.S.C. 154(b) by 0 days.

(21) Appl. No.: 09/300,411

(22) Filed: Apr. 27, 1999

(30) Foreign Application Priority Data

Apr. 28, 1998 (JP) ................................................ 10-119187

(51) Int. Cl.[7] ........................................................ G11B 7/00
(52) U.S. Cl. ...................................... 369/47.16; 369/47.21
(58) Field of Search ................................ 369/47.1, 47.11, 369/47.14, 47.15, 47.16, 47.21, 47.24, 53.1, 53.11, 53.2, 53.41, 59.1, 59.23

(56) References Cited

U.S. PATENT DOCUMENTS 5,280,572 * 1/1994 Case et al. .
5,825,731 * 10/1998 Yokota .

* cited by examiner

*Primary Examiner*—Muhammad Edun
(74) *Attorney, Agent, or Firm*—Morgan, Lewis & Bockius LLP

(57) ABSTRACT

Prior to reading text information, size information segment is read out, a block position where desired text information has been recorded is calculated on the basis of the read size information segment, and a reading position on a recording medium is determined on the basis of the calculated block position.

2 Claims, 10 Drawing Sheets

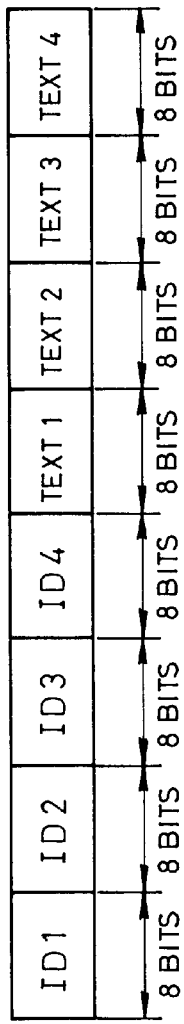
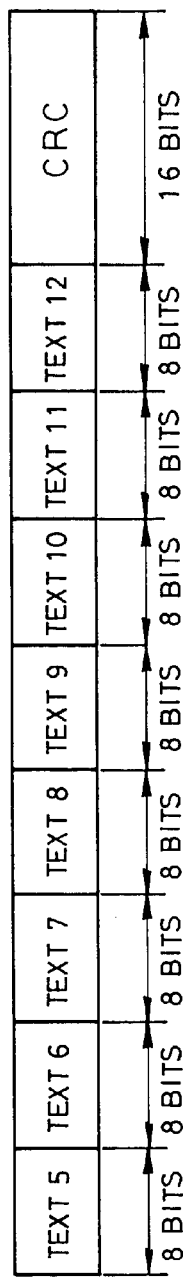
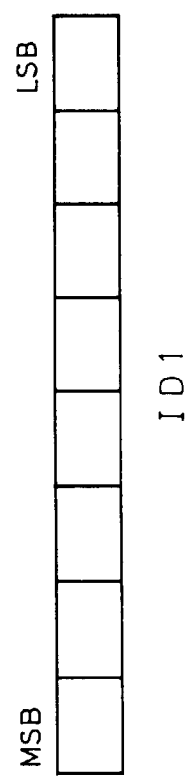
FIG. 3
FIG. 4

FIG. 5

| ID1 | DESCRIPTION |
|---|---|
| $80 | TITLE OF ALBUM NAME (ID2=$00)<br>TRACK TITLE (ID2=$0···$63) |
| $81 | NAME(S) OF THE PERFORMER(S) (i.e., SINGER(S), PLAYER(S), CONDUCTOR(S), ORCHESTRA(S)) |
| $82 | NAME(S) OF THE SONGWRITER(S) |
| $83 | NAME(S) OF THE COMPOSER(S) |
| $84 | NAME(S) OF THE ARRANGER(S) |
| $85 | MESSAGE(S) FROM CONTENT PROVIDER AND/OR ARTIST |
| $86 | DISC IDENTIFICATION INFORMATION |
| $87 | GENRE IDENTIFICATION AND GENRE INFORMATION |
| $88 | TABLE OF CONTENT INFORMATION |
| $89 | SECOND TABLE CONTENT INFORMATION |
| $8A | RESERVED |
| $8B | RESERVED |
| $8C | RESERVED |
| $8D | CLOSED INFORMATION (FOR INTERNAL USE BY CONTENT PROVIDER ONLY) |
| $8E | UPC/EAM CODE OF THE ALBUM AND ISRC CODE OF EACH TRACK |
| $8F | SIZE INFORMATION OF THE BLOCK |

| ID1 | ID2 | ID3 | ID4 | TEXT 1 | TEXT 2 | TEXT 3 | TEXT 4 |
|---|---|---|---|---|---|---|---|
| 8Fh | 00h | SEQUENCE NUMBER | BLOCK NUMBER | CHARACTER CODE FOR THIS BLOCK | FIRST TRACK NUMBER | LAST TRACK NUMBER | MODE 2 & COPY PROTECTION FLAGS |

| TEXT 5 | TEXT 6 | TEXT 7 | TEXT 8 | TEXT 9 | TEXT 10 | TEXT 11 | TEXT 12 | CRC |
|---|---|---|---|---|---|---|---|---|
| NUMBER OF PACK WITH ID1=$80 | NUMBER OF PACK WITH ID1=$81 | NUMBER OF PACK WITH ID1=$82 | NUMBER OF PACK WITH ID1=$83 | NUMBER OF PACK WITH ID1=$84 | NUMBER OF PACK WITH ID1=$85 | NUMBER OF PACK WITH ID1=$86 | NUMBER OF PACK WITH ID1=$87 | |

FIG.10

| ID1 | ID2 | ID3 | ID4 | TEXT 1 | TEXT 2 | TEXT 3 | TEXT 4 |
|---|---|---|---|---|---|---|---|
| 8Fh | 01h | SEQUENCE NUMBER | BLOCK NUMBER | NUMBER OF PACK WITH ID1=$88 | NUMBER OF PACK WITH ID1=$89 | NUMBER OF PACK WITH ID1=$8A | NUMBER OF PACK WITH ID1=$8B |

| TEXT 5 | TEXT 6 | TEXT 7 | TEXT 8 | TEXT 9 | TEXT 10 | TEXT 11 | TEXT 12 | CRC |
|---|---|---|---|---|---|---|---|---|
| NUMBER OF PACK WITH ID1=$8C | NUMBER OF PACK WITH ID1=$8D | NUMBER OF PACK WITH ID1=$8E | NUMBER OF PACK WITH ID1=$8F | LAST SEQUENCE NUMBER BLOCK 0 | LAST SEQUENCE NUMBER BLOCK 1 | LAST SEQUENCE NUMBER BLOCK 2 | LAST SEQUENCE NUMBER BLOCK 3 | |

FIG.11

| ID1 | ID2 | ID3 | ID4 | TEXT 1 | TEXT 2 | TEXT 3 | TEXT 4 |
|-----|-----|-----|-----|--------|--------|--------|--------|
| 8Fh | 02h | SEQUENCE NUMBER | BLOCK NUMBER | LAST SEQUENCE NUMBER BLOCK 4 | LAST SEQUENCE NUMBER BLOCK 5 | LAST SEQUENCE NUMBER BLOCK 6 | LAST SEQUENCE NUMBER BLOCK 7 |

| TEXT 5 | TEXT 6 | TEXT 7 | TEXT 8 | TEXT 9 | TEXT 10 | TEXT 11 | TEXT 12 | CRC |
|--------|--------|--------|--------|--------|---------|---------|---------|-----|
| LANGUAGE CODE BLOCK 0 | LANGUAGE CODE BLOCK 1 | LANGUAGE CODE BLOCK 2 | LANGUAGE CODE BLOCK 3 | LANGUAGE CODE BLOCK 4 | LANGUAGE CODE BLOCK 5 | LANGUAGE CODE BLOCK 6 | LANGUAGE CODE BLOCK 7 | |

REPRODUCING APPARATUS WITH IMPROVED ACCESS TO TEXT INFORMATION

BACKGROUND OF THE INVENTION

1. Field of the Invention

The invention relates to a recorded information reproducing apparatus and, more particularly, to a recorded information reproducing apparatus of a recording medium, for example, a CD Text disc for digital audio on which text information is recorded in a subcode data associated with main data such as audio data, visual data, or the like.

2. Related Background Art

Hitherto, in case of reproducing desired data on a recording medium such as a CD Text on which text information corresponding to a plurality of languages has been recorded as subcode data, a plurality of text information blocks are preliminarily read and information on the block of a desired language is extracted from the read text information. There arises a problem that it takes time until the data of the desired language is obtained and a memory area for storing a plurality of information blocks is required. That is, it is a subject how fast the block of the desired language on the recording medium is accessed from viewpoints of saving of a capacity of RAM (Random Access Memory) provided in the reproducing apparatus and reduction of a data reading time.

OBJECT AND SUMMARY OF THE INVENTION

The present invention is made from the consideration of the above-mentioned points and it is an object of the invention to provide a recorded information reproducing apparatus wherein an information block of a desired language can be accessed in a short time, thereby memory in the reproducing apparatus can be saved and a data reading time can be reduced, when a recording medium on which character data of a plurality of languages has been recorded in each block as subcode data like a CD Text is reproduced.

According to the present invention, there is provided a recorded information reproducing apparatus for reading text information included in subcode data associated with main data from a recording medium and for displaying the text information, wherein each of the text information of a plurality of languages and the corresponding size information segment are contained in individual one of a series of information blocks recorded on the medium, and wherein each of the size information segments includes index information corresponding to each of the text information, comprising: means for reading one of the size information segments prior to reading the text information; means for storing the read size information segment; means for calculating a block position where desired text information has been recorded on the basis of the stored size information segment; and means for determining a reading position on the recording medium on the basis of the calculated block position.

BRIEF DESCRIPTION OF THE DRAWINGS

FIG. 3 is a diagram showing a data format of a pack;

FIG. 4 is a diagram showing a data structure of ID1;

FIG. 5 is a diagram showing ID1 and the corresponding content of data that is handled in a pack;

FIG. 9 illustrates a data structure of a pack showing size information;

FIG. 10 illustrates a data structure of a pack showing size information;

FIG. 11 illustrates a data structure of a pack showing size information;

DETAILED DESCRIPTION OF THE PREFERRED EMBODIMENT

Figure 1:
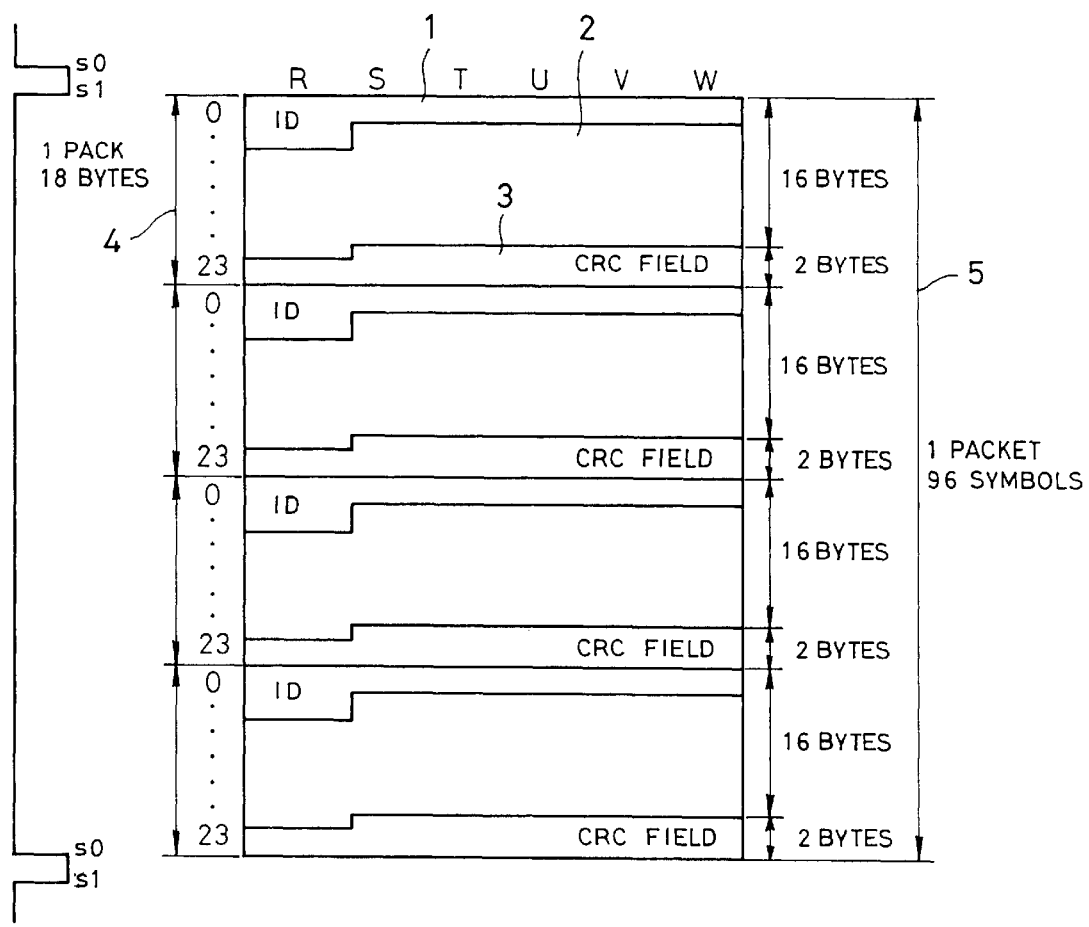
FIG. 1 is a diagram showing a data structure of a subcode of a CD Text.

An embodiment of the present invention will now be described in detail with reference to the drawings. As an example of a recording medium which is reproduced by a recorded information reproducing apparatus according to the invention, a CD Text will now be described. FIG. 1 shows a data structure of a subcode of the CD Text. The subcode is recorded as a part of TOC (Table of Contents) data which is recorded in a program management area. In a case of the existing CD (Compact Disc), the total number of programs (music pieces) and a recording position of each program are managed by using data of 72 bits in one frame of the subcode in the Q channel. More specifically, an address (absolute time) at which each of the movements (i.e., 00 to 99) starts, the number of the first movement, the number of the last movement, and an address at which a read-out starts are recorded. In addition to the subcode of the Q channel, data configured by R to W channels as shown in FIG. 1 is recorded as TOC data.

The first two frames of the data comprising the R to W channels are sync patterns S0 and S1. The remaining 96 frames includes 96 symbols each consisting of 6 bits. The 96 symbols are divided into four 24 symbols. The 24 symbols is called one pack, and four packs is called one packet.

An ID field 1 comprising ID codes of total 24 bits is provided at a head position of each pack. The ID field 1 includes ID1 having mode information for setting a recording mode of information to be recorded in the pack and identification information of the type of text information, and ID codes (ID2, ID3, and ID4) having the other identification information. A text data field 2, in which the text information associated with the main data is recorded on an 8-bit unit basis, is arranged after the ID field 1. Subsequently to the text data field 2, a CRC field 3, in which 16 bits data for performing an error detection with a CRC (Cyclic Redundancy Code) as an error detection code is recorded, is placed in each pack.

Figure 2A:
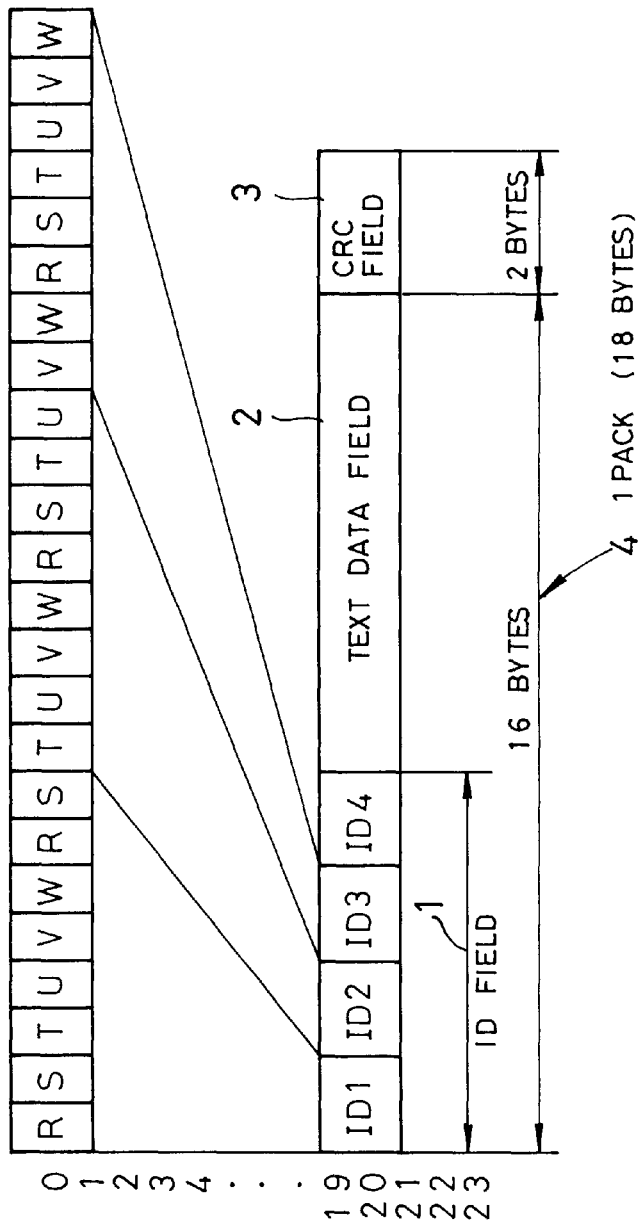
FIGS. 2A and 2B are diagrams showing the data structure shown in FIG. 1 in the form of serial data.

FIG. 2A shows a pack format wherein the data structure of FIG. 1 is shown in the form of serial data. The first 32 bits of the pack (only 24 bits are shown in FIG. 2A) is divided into four 1 byte (8 bits) data. Each byte is allocated to the indicators ID1, ID2, ID3, and ID4, respectively, and the indicators form the ID field 1. The subsequent text data field 2 is also divided into data on a byte unit basis.

Figure 2B:
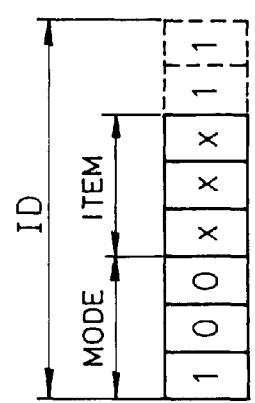

As shown in FIG. 2B, the leading code of the ID field 1, ID1, consists of eight bits, which is larger than one CD symbol by two bits. Further, data similar to that of the above-mentioned mode is written into three bits from the MSB (Most Significant Bit) so as not to cause an erroneous operation of an existing CD reproducing apparatus having a function to decode the subcode data of the R to W channels even if the CD is loaded into the reproducing apparatus. As a mode represented by those three bits, for example, mode 4 ("100") is allocated to a lead-in area and, for example, a mode 2 ("010") is allocated to a program area.

In a CD Text in which mode 4 is designated by ID1, a data format in the pack includes ID1, ID2, ID3, and ID4 divided every 8 bits (1 byte), text bytes TEXT1 to TEXT12, and a CRC code of two bytes as shown in FIG. 3. ID1 is constructed by eight bits as shown in FIG. 4. Items of data handled in the pack are specified as shown in FIG. 5.

Figure 6:
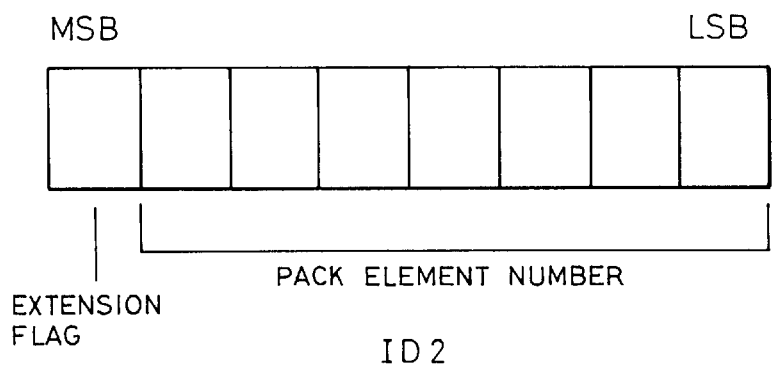
FIG. 6 is a diagram showing a data structure of ID2.

As shown in FIG. 6, MSB of the ID2 denotes an extension flag. The remaining seven bits indicate a pack element number, and denotes a serial number of the pack when the information exists over a plurality of packs.

Figure 7:
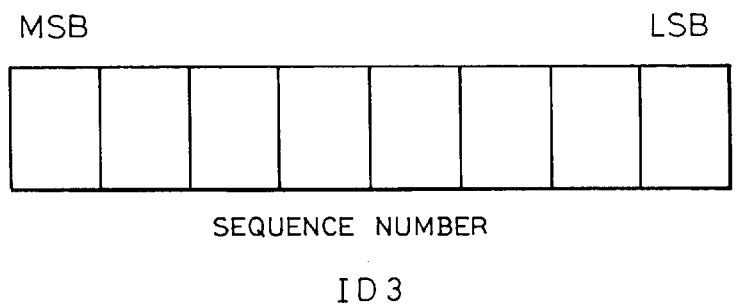
FIG. 7 is a diagram showing a data structure of ID3.

As shown in FIG. 7, ID3 indicates a pack sequence number and it is sequentially incremented from the first pack in the same block. The first pack of the block is set to 0.

Figure 8:
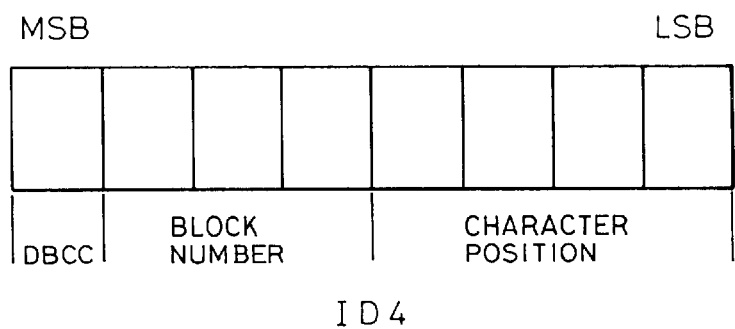
FIG. 8 is a diagram showing a data structure of ID4.

As shown in FIG. 8, regarding ID4, the MSB is a double byte character code (DBCC). When the ID1 of a pack is one of $80–$85 and the text data of the pack is of a two bytes character, the DBCC's of all the packs in the block including such a pack are set to 1, and when the text data is one byte character, the DBCC's are set to 0. Subsequent three bits indicate the block number of the block including such a pack. Last four bits show a character position and indicate the location of the first character in the text data field (TEXT1 in FIG. 3) in a whole sentence.

As an example of the data format of mode 4, a data structure of a pack in which ID1 is equal to "8Fh", namely, a pack showing a block size information (hereinafter, simply referred to as "size information") is shown in FIGS. 9 to 11. The size information is consists of three packs and one size information is recorded for each block.

Contents of each element of the data structure will now be described in detail hereinbelow.

ID1 to ID4 of the first pack among three packs in which ID1 is equal to $8F are as mentioned above. Each byte of the text data field will now be sequentially explained.

"Character Code for this Block" shows a character code which is used in the character information among the packs in which ID1 is set to $80 to $85 and is defined, for example, as follows.

$00=IS08859–1
$01=ASCII
$02~$7F=reserved
$80=Music Shift—JIS
$81=Korean Character Code
$82=Mandarin Chinese Character
$83~$FF=reserved "First Track Number" denotes the number of the first music piece recorded on the disc.

"Last Track Number" indicates the number of the last music piece recorded on the disc.

The MSB of "Mode2 & Copy Protection Flags" shows whether there is a pack in which text information has been recorded in the program area or not. When this flag is set to 1, this means that there is a pack of the text information. The other bits are reserved for copy protection.

"Number of Pack with ID1=$80–$8F" indicates the total number of packs which are used in the information of every ID1.

"Last Sequence Number Block 0–7" shows the last sequence number of each block. That is, since the sequence number of the head pack of the block is equal to 0, "Last Sequence Number Block X+1" indicates the total number of packs of the block X.

"Language Code of Block 0–7" denotes a language of each block.

In the data in the size information, there are the data that is common to each block and the data that is specific to each block. Specifically speaking, the data common to the blocks includes "Last Sequence Number Block", "Language Code of Block 0–7", "First Track Number", "Last Track Number", "Mode2 & Copy Protection Flags", and "Number of Pack with ID1=$80–$8F". The other data is specific to the block.

Figure 12:
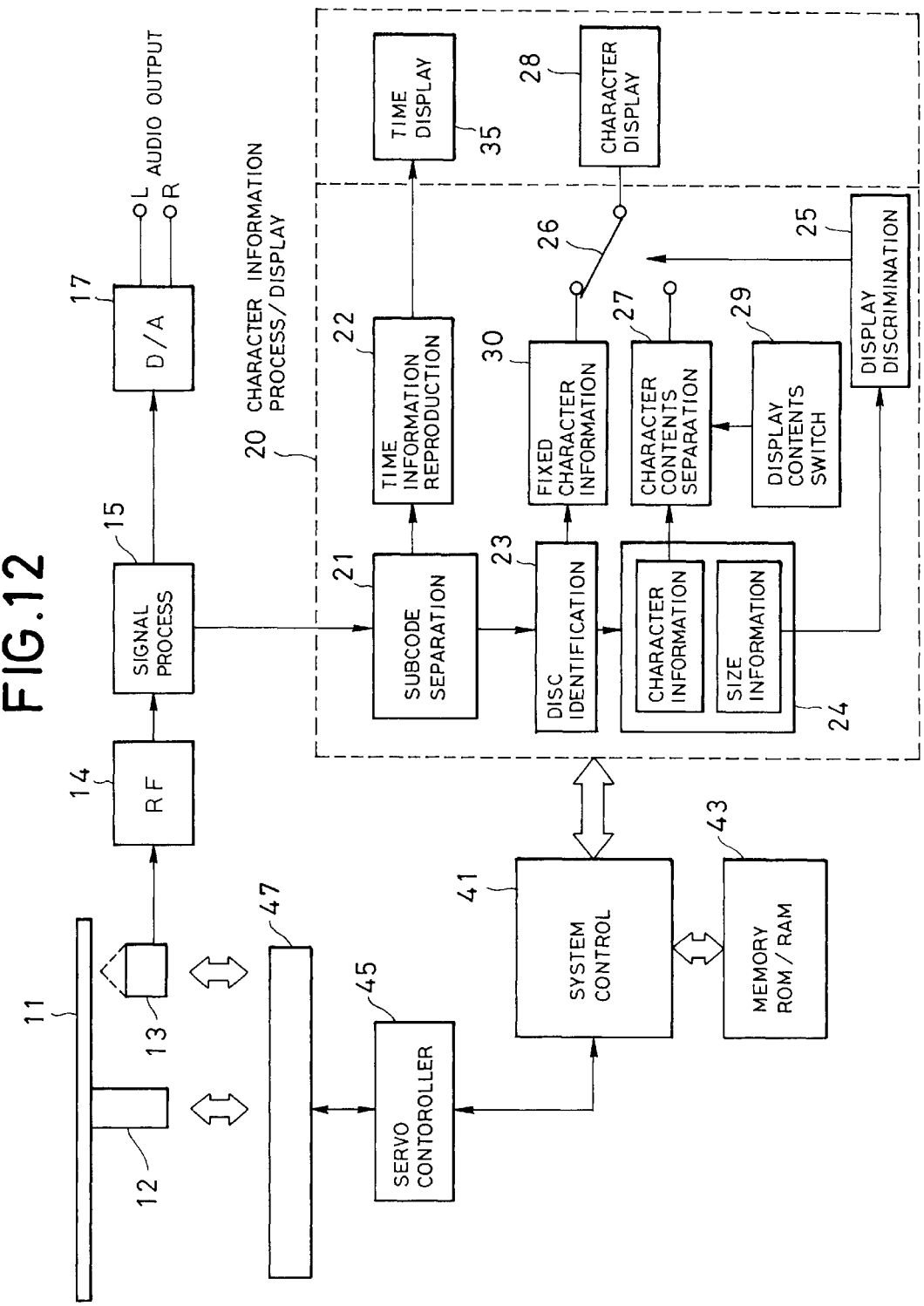
FIG. 12 is a diagram schematically showing a configuration of a recorded information reproducing apparatus according to the present invention.

FIG. 12 schematically shows a configuration of a recorded information reproducing apparatus according to the present invention. In the recorded information reproducing apparatus in FIG. 12, for example, a digital recording disc such as a CD Text or the like is used as a recording medium.

A CD 11 is rotated by a spindle motor 12 and recording contents are read out by an optical pickup 13. A signal from the optical pickup 13 is supplied to a signal processing circuit 15 for digital processes via an RF circuit 14. A digital audio signal component from the signal processing circuit 15 is converted into an analog audio signal by a D/A (digital-to-analog) converter 17 and is output from an analog audio signal output terminal. Such a processing of the audio data is similar to those in the conventional CD player.

In the recorded information reproducing apparatus, a subcode extracted by the signal processing circuit 15 from the signal read out by the optical pickup 13 is sent to a subcode separating circuit 21 in a character information processing/displaying circuit 20 to separate the Q channel and the R to W channels. The character information processing/displaying circuit 20 is controlled by a system control circuit 41 connected through a signal bus and transmits and receives data to/from a memory 43. On the basis of the subcodes of the R to W channels which is sent from the subcode separating circuit 21, a disc identifying circuit 23 discriminates whether the CD 11 is a CD in which the text information has been recorded in the R to W channels of the subcode or not. When the loaded CD is a CD in which the text information has been recorded in the R to W channels, a subcode processing circuit 24 receives an operation input signal from the disc identifying circuit 23. Information of each item, for example, character information such as album title, name of player, and the like and size information are extracted by processing the data in the R to W channels supplied from the subcode separating circuit 21 on the basis of a predetermined conversion code such as ASCII code as mentioned above or the like. Those information is simultaneously stored into the memory 43 individually through a data bus under the control of the system control circuit 41.

The size information separated by the subcode processing circuit 24 is sent to a display discriminating unit 25 and a check is made to see if a character code in the size information is a character code in which a predetermined conversion can be adapted. A discrimination result is transmitted to a change-over switch 26. When it is determined that the character display is possible, the change-over switch 26 switches to a character contents separating circuit 27. In accordance with the operation or the like of a display contents switch 29, character information (album title, name of the player, etc.) based on the selected display contents is sent to a character display unit 28, by which the selected display contents are displayed. When it is decided that the character display is impossible, the switch 26 switches to a fixed character information portion 30. In this case, character information of, for example, "no relevant data for display" is sent to the character display unit 28. A message indicating that the character information corresponding to the selected language cannot be displayed is displayed.

The subcode is separated to the Q channel and the R to W channels by the subcode separating circuit 21. The subcode data of the Q channel is reproduced by a time information reproducing circuit 32 and, after that, the resultant time information is supplied to a time display unit 35 and the corresponding time is displayed.

The system control circuit 41 is connected to a reading system servo controller 45 and performs a spindle control of the recording medium rotating system and a control of an optical pickup.

Figure 13:
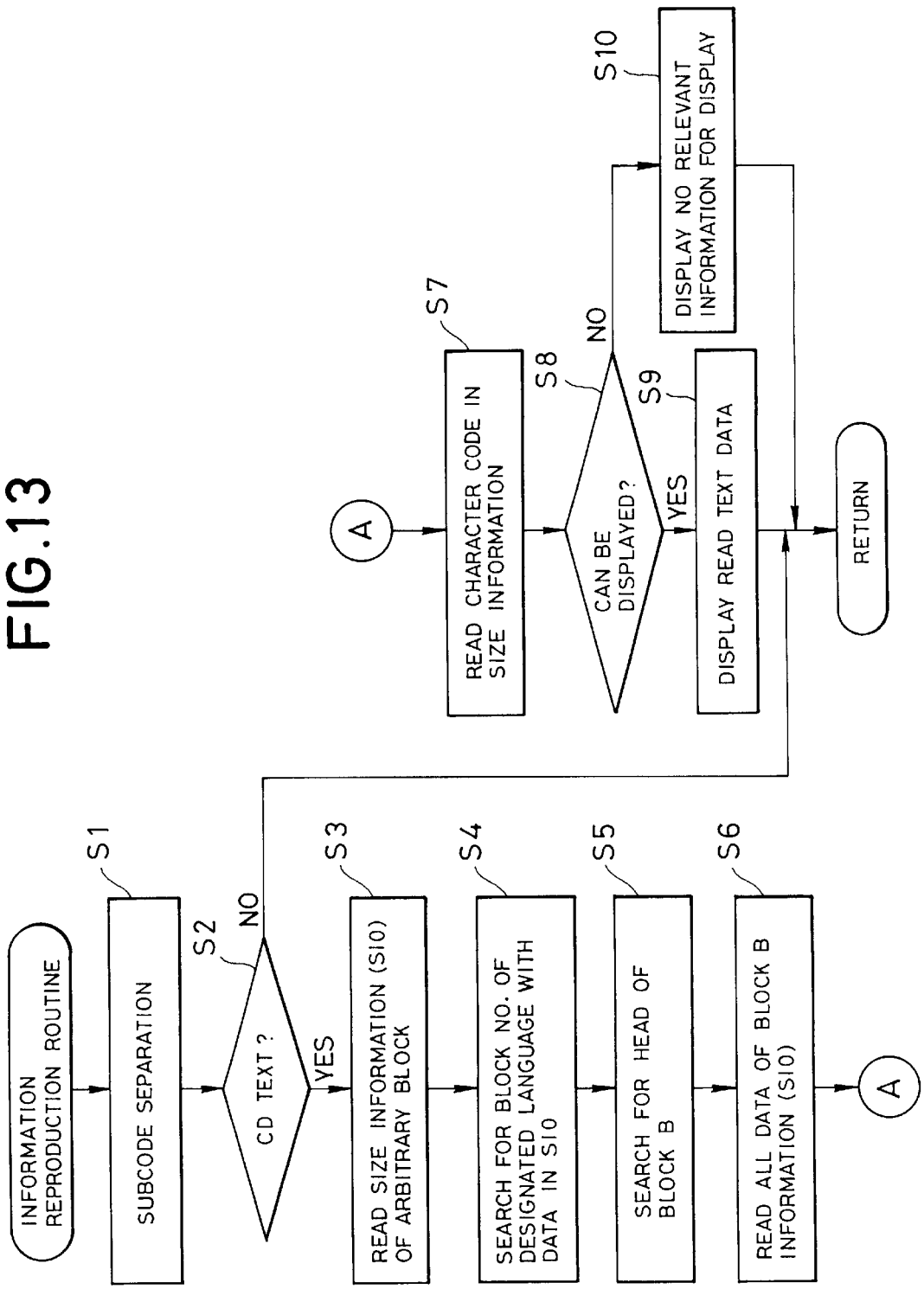
FIG. 13 is a flowchart for an information reproducing routine that is performed by a system control circuit 41.

In the recorded information reproducing apparatus according to the invention, a case of searching to the designated language block and displaying the designated character information will now be described with reference to a flowchart of FIG. 13. FIG. 13 shows a flow of an information reproducing routine that is executed by the system control circuit 41. It is now assumed that after the CD 11 was loaded, the TOC data has been read out.

First, the subcode of the Q channel and the subcodes of the R to W channels are separated by the subcode separating circuit 21 (step S1). It is discriminated by the disc identifying circuit 23 (step S2) whether the text information has been recorded as TOC data on the loaded CD 11 or not. For example, when ID1 in the text information supplied from the subcode separating circuit 21 is not equal to 8Xh, it is determined that the text information is not recorded as TOC data on the CD 11.

When it is determined in step S2 that the text information has been recorded as TOC data, size information SI0 of an arbitrary block in the CD 11 is read (step S3). The block number of the language designated by the display contents switch 29 is searched by using the data in the size information SI0 (step S4). The head position of the block number of the designated language is calculated by the "Last Sequence Number Block" of the read size information SI0 and an instruction to search is issued (step S5). All of the data of the designated block is read (step S6). A character code in the size information of the designated block is read (step S7).

It is discriminated by the display discriminating unit 25 (step S8) whether the read character code can be displayed by the apparatus or not. If it is determined that the display is possible, in the data read in step S6, the data (for example, the album title or the name of singer) corresponding to the display contents selected by the display contents switch 29 is displayed by the character display unit 28 (step S9). In this instance, as mentioned above, the character information determined such that it can be displayed is stored into the memory 43 under the control of the system control circuit 41. If it is determined that the display is impossible, predetermined character information held in the memory 43, for example, character information of "there is no display relevant information" is displayed by the character display unit 28 (step S10).

An example of searching for the head position of a predetermined block B in step S5 of the flowchart will now be described. Particularly, when a target location is considerably distant from the current location of the reading means, by jumping the tracks by the conventional method on the basis of the number of tracks calculated as follows, it is possible to soon reach the target location.

(1) First, the following data is obtained.
1. The block number of the current location and the sequence number of the pack (obtained from ID4 and ID3 of the size information SI0 read in step S3).
2. The block number corresponding to the designated language (obtained in step S3).
3. The number of packs (obtained by the "Last Sequence Number Block" of the size information SI0 read in step S3) for each block.
4. The maximum number of packs per track.

For example, in a case of searching for the block in the lead-in area, the number of tracks can be calculated by the following equation.

(Outermost circumference of the lead-in area)/(lowest linear velocity×the number of packs per second)

In case of a CD,

Outermost circumference of the lead-in area=3.14×50 [mm]

Lowest linear velocity=1200 [mm/sec]

The number of packs per second=75 [frames/sec]×4 [packs/frame]

Therefore, the following number is obtained.

(3.14×50/1200)×75×4=38.75 [packs]

(2) The number of packs between the target location and the current location is subsequently obtained on the basis of the obtained information and is divided by the maximum number of packs per track, so that the number of tracks to be jumped is obtained. It is possible to jump to a position near the target location.

For example, it is now assumed as follows.

Current location=pack sequence number 10 of the block number 0

Target location=pack sequence number 10 of the block number 2

The total number of packs of block 0=50 packs

The total number of packs of block 1=30 packs

The total number of packs of block 2=40 packs

In this case, now assuming that:

The number of packs between the target location and the current location=(50+30−10)+20=90 packs Now, assuming that there are 40 packs per track:

The number of tracks: 80/40=2 tracks

Therefore, in this case, a jump of two tracks is performed.

An example of discriminating whether the display is possible or not in step S8 of the flowchart will now be explained as follows.

(1) First, the following data is obtained.
1. Character code of the read block (process in step S6).
2. Character code to which the character display unit 28 corresponds (previously held by the display discriminating unit 25 of the reproducing apparatus).

(2) The character code of the read block is compared with the character code to which the apparatus corresponds, thereby discriminating whether the display is possible or not. For example, when the character display unit is a display of 14 segments, the codes of ASCII and ISO8859-1 can be displayed (the code of MS-JIS cannot be displayed). When a display of (16×16) dots and a Kanji ROM have been installed, the codes of MS-JIS, ASCII, and ISO8859-1 can be displayed.

Although the CD has been described as an example of the recording medium in the embodiment of the invention, the invention is not limited to the CDs. The invention can be also applied to any one of the other kinds of recording media such as optical disc (for instance, DVD (digital versatile disc)), magnetic tape, optical tape, semiconductor memory, and the like. The information recorded on the recording medium is not limited to the audio data but video data or the like can be also recorded.

According to the invention as described in detail above, an information reproducing apparatus can be realized, wherein an information block of a desired language can be accessed in a short time, thereby memory in the reproducing apparatus can be saved and a data reading time can be reduced, when a recording medium on which character data of a plurality of languages has been recorded in each block as subcode data like a CD Text is reproduced.

Further, an information reproducing apparatus can be realized, wherein a memory can be saved, and a reproducing time can be reduced by discriminating whether the text information recorded in the block of a desired language on the recording medium can be displayed or not.

What is claimed is:

1. A recorded information reproducing apparatus for reading text information included in subcode data associated with main data from a recording medium and for displaying said text information, wherein each of said text information of a plurality of languages and the corresponding size information segment are contained in individual one of a series of information blocks recorded on said medium, and wherein each of said size information segments includes index information corresponding to each of said text information, comprising:

means for reading one of said size information segments prior to reading said text information;

means for storing the read size information segment;

means for calculating a block position where desired text information has been recorded on the basis of the stored size information segment; and means for determining a reading position on said recording medium on the basis of the calculated block position.

2. An apparatus according to claim 1, wherein said text information is recorded in R to W channels of a subcode.

* * * * *